July 31, 1962  O. MAYR  3,047,086
CONTROL ARRANGEMENT FOR TRACTORS
Filed March 21, 1958  4 Sheets-Sheet 1

INVENTOR
OTMAR MAYR

BY Dicke and Craig
ATTORNEYS

July 31, 1962     O. MAYR     3,047,086
CONTROL ARRANGEMENT FOR TRACTORS

Filed March 21, 1958     4 Sheets-Sheet 2

INVENTOR
OTMAR MAYR

BY *Dicke and Craig*

ATTORNEYS

July 31, 1962 O. MAYR 3,047,086
CONTROL ARRANGEMENT FOR TRACTORS
Filed March 21, 1958 4 Sheets-Sheet 3
FIG. 5
FIG. 6
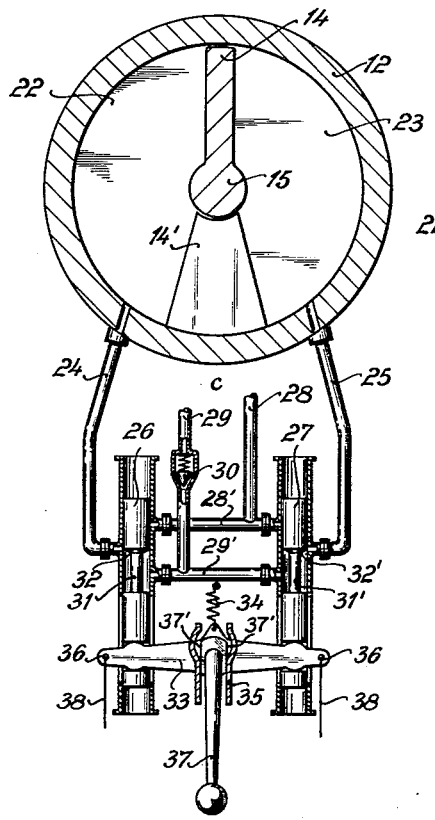
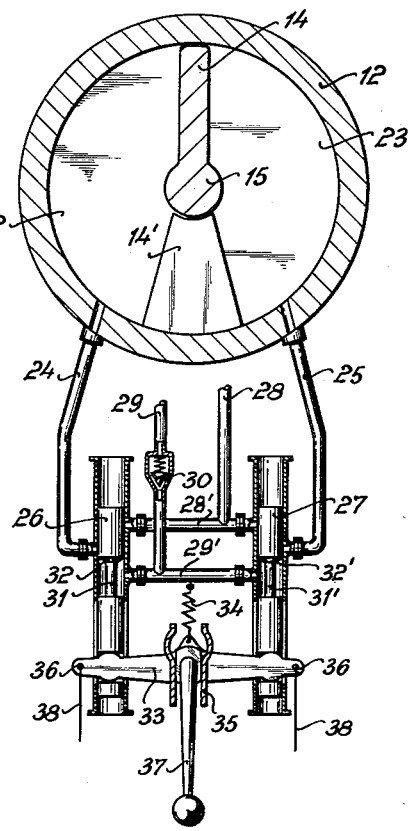
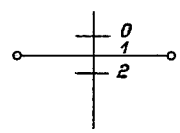
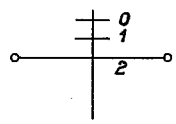
INVENTOR
OTMAR MAYR
BY Dickey and Craig
ATTORNEYS July 31, 1962 — O. MAYR — 3,047,086
CONTROL ARRANGEMENT FOR TRACTORS
Filed March 21, 1958
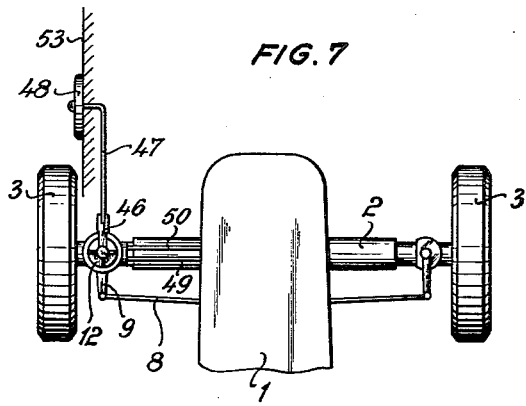
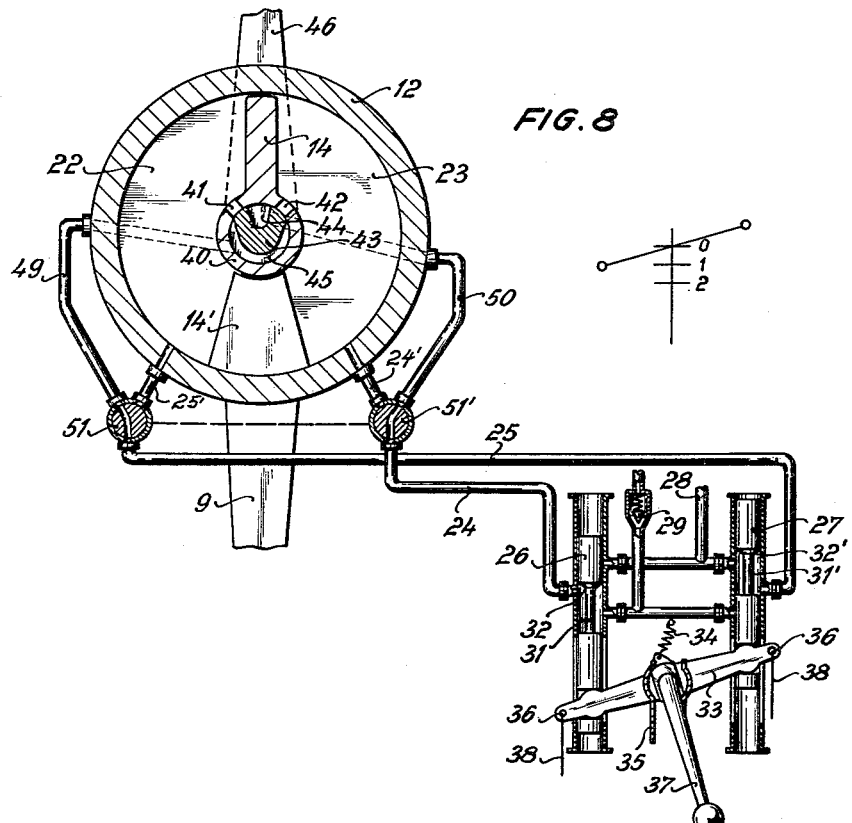
INVENTOR
OTMAR MAYR
BY Dicke and Craig
ATTORNEYS

United States Patent Office 3,047,086
Patented July 31, 1962

3,047,086
CONTROL ARRANGEMENT FOR TRACTORS
Otmar Mayr, Plochingen (Neckar), Germany, assignor to Firma Dr. Ing. h.c.F. Porsche K.G., Stuttgart-Zuffenhausen, Germany
Filed Mar. 21, 1958, Ser. No. 722,873
Claims priority, application Germany Mar. 30, 1957
14 Claims. (Cl. 180—79.2)

The present invention relates to a control arrangement for tractors, especially for tractors used in agriculture and provided with a servo mechanism which aids the steering movement thereof.

In the control arrangements of this type known in the prior art, the servo installation is organically interconnected into the steering linkage and serves exclusively for aiding the steering movement during manual steering of the front wheels. The expenditures connected therewith are relatively large and by reason of the limited usefulness are not justified, especially not in connection with tractors.

According to the present invention, an economic exploitation of an available energy source is achieved in that the installation includes a servo motor operatively connected with the steering mechanism and a control device which is adapted to control several independent operating positions for mutually different control functions and operating conditions, for example, for actuation of a remote or auxiliary steering force, of a damping arrangement for the steering system, of a locking arrangement for the steering, or the like. As a result of such a construction, several separate aggregates or installations ordinarily arranged separately at the tractor for the respective purpose, for example, for the locking arrangement of the steering system, may be replaced by a single device whereby a very high efficiency is obtained. By reason of the absence of separate aggregates, an installation in accordance with the present invention is only insignificantly more expensive if considered from an overall point of view.

The arrangement according to the present invention is made in such a manner that the control apparatus controls at least one open and several closed pressure circulatory systems by the use of an adjusting member operatively connected with the control means. As a result of such an arrangement, the tractor may also be operated by the operator remote from the driver's seat with the aid of a servo motor or may be provided with a readjusting device for the automatic tracking of the tractor.

A simple construction is achieved in accordance with the present invention in that the control apparatus is provided with positively controlled valve members having a common supply and discharge means for the pressurized medium which are in communication with the servo motor over pressure lines. The positive control of the control valve members is effected by an adjusting member which may be selectively operated either at or remote from the vehicle or tractor. By reason of the fact that the adjusting member is constituted by a double-armed lever which is directly connected with the slide valve members and which is guided in a suitable guide arrangement a very handy, compact apparatus is realized which may be readily accommodated.

Two axial pistons disposed parallel to each other are provided as control valve members which are provided with at least one conically extending control edge. The servo motor is arranged advantageously remote from the control apparatus in the steering linkage between the steering gear and the steerable wheels and is formed by a rotary piston member. The rotary piston member is arranged in a readily detachable manner on one of the axle spindles of the front axle arrangement by means of a suitable detachable coupling. Such an arrangement makes it possible to equip, without any extensive changes or modifications depending on the particular requirements, any tractor with an installation according to the present invention. Moreover, such installations may be readily installed subsequently into already existing vehicles after manufacturing assembly thereof.

The rotary piston member of the servo mechanism may also form part of a sensing device for controlling the vehicle along a pre-existing or predetermined vehicle track, whereby the versatility of the installation is further increased. For that purpose, the rotary piston member is provided with a hollow shaft which is in communication with the pressure spaces and which contains a control piston member for readjusting the rotary piston member. A guide member is operatively connected with the control piston member which carries the sensing roller of a furrows-control arrangement running along the furrow which had been established during previous tilling of the soil.

Accordingly, it is an object of the present invention to provide a control system for tractors having a servo mechanism which is simple in structure, yet versatile in its application and which, by reason of its versatility and relatively low expenditures connected therewith, justifies such installation in a tractor.

Another object of the present invention is the provision of a control arrangement and servo mechanism which not only is adapted to assist in the steering of the vehicle but also enables the use thereof for purposes of achieving other control functions.

Still another object of the present invention resides in the provision of a servo steering and control mechanism which may be readily installed in tractors either during assembly thereof or after assembly into already existing tractors.

Another object of the present invention is the provision of a servo control and steering mechanism which is compact and permits the use thereof for control functions other than as power steering assistance.

These and other objects, features and advantages of the present invention will become more obvious from the following description when taken in connection with the accompanying drawing, which shows, for purposes of illustration only, several embodiments in accordance with the present invention, and wherein:

FIGURES 3 through 6 are schematic views of the control apparatus in different operating positions thereof;

FIGURE 7 is a partial top plan view of a tractor provided with an auto-steering system operatively connected with the servo mechanism which controls the tractor so as to follow a pre-existing track or path, for instance, a pre-existing furrow; and FIGURE 8 is a schematic view partially in cross section of the control apparatus of the system of FIGURE 7.

Figure 1:
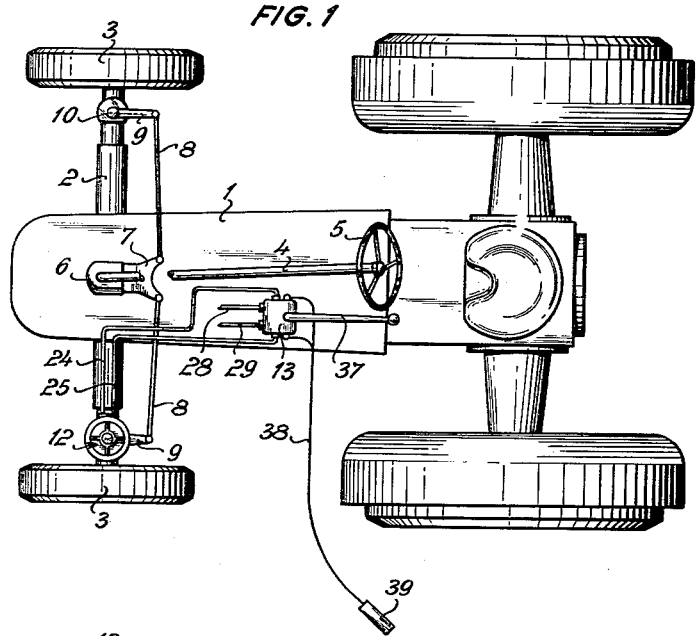
FIGURE 1 is a schematic top plan view of a tractor provided with a servo installation according to the present invention.
Figure 2:
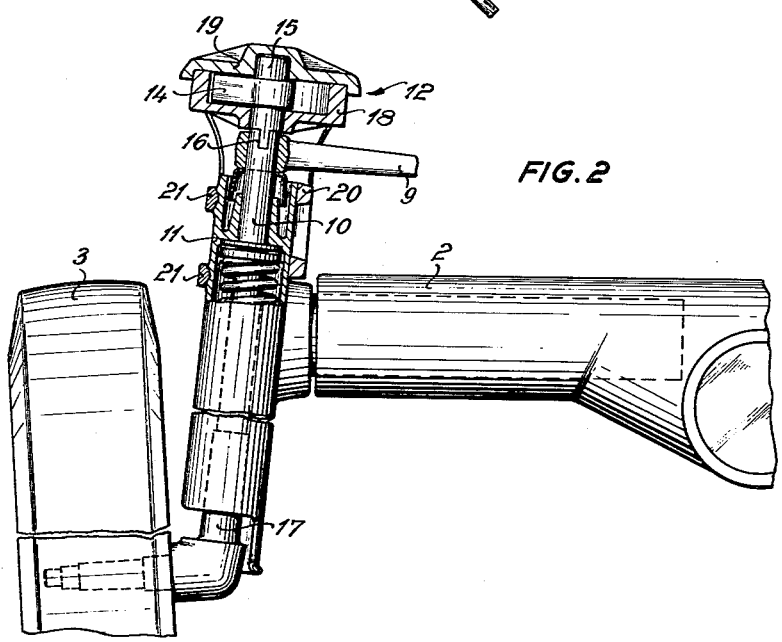
FIGURE 2 is a cross-sectional view on an enlarged scale through the servo motor and parts of the steering system surrounding the same.

Referring now to the drawing, wherein like reference numerals are used throughout the various views thereof to designate like parts, and more particularly to FIGURE 1 thereof, reference numeral 1 designates a tractor which includes a front axle 2 on which the wheels 3 of the tractor are mounted in any suitable manner. The wheels are adapted to be steered by a mechanical steering arrangement 4 of conventional construction. The steering arrangement 4 includes a steering gear 6 actuated by the steering wheel 5, the connecting or tie rods 8 being connected with the steering gear 6 over the steering gear arm 7. The connecting or tie rods 8 are connected with the steering levers 9 which in turn are secured at the steerable axle shafts 10 of the wheels 3 (FIGURES 1 and 2). The steerable axle shaft 10 is surrounded by a tubular support member 11 (FIGURE 2). One of these steerable axle shafts 10 is connected with a servo motor generally designated by reference numeral 12 which is actuated by the control apparatus 13 (FIGURE 1). The servo motor 12 is formed by a rotary piston member 14, the shaft 15 of which is seated in a readily detachable manner in the pin 17 of the steerable axle shaft 10 by means of a suitable coupling 16.

The rotary piston member 14 slides in a housing 18 (FIGURE 2) which is closed by a cover 19 and which is supported at the tubular member 11 with an extended throat or neck portion 20 thereof. The connection takes place by means of bow-shaped tensioning members 21.

The working spaces 22 and 23 (FIGURES 3 to 6) of the rotary piston member 14 are limited by an abutment 14' and are connected over lines 24 and 25 with the control apparatus 13. The control apparatus 13 includes two control valve members formed by two axial pistons 26 and 27 disposed parallel to each other which possess a common supply line 28 for the pressurized medium (FIGURES 3 and 4) and a common discharge line 29. An adjustable valve member 30 constituting an adjustable relief valve is arranged in line 29, whereas the line 28 is connected with the hydraulic pump for a power lifting arm which, as a rule, is present in such types of vehicles. The spool-type slide valve pistons 26 and 27 are provided, for purposes of control of the pressure medium, with annular grooves 31 and 31', whereby one of the control edges 32 or 32' of each piston extends essentially conically. The control pistons 26 and 27 are positively controlled and for that purpose are in operative engagement with an adjusting member 33 constructed as a double-armed lever. The adjusting member 33 is guided, under the influence of a coil spring 34, in a relatively stationary guide means 35 of any suitable construction and configuration. The free ends of the adjusting member 33 are provided with apertures 36 whereas the control lever 37 of the installation is operatively connected therewith in the center thereof. A wire or Bowden cable 38 each is secured in the respective aperture 36 for purposes of remote control.

OPERATION

Normal Operation

Figure 3:
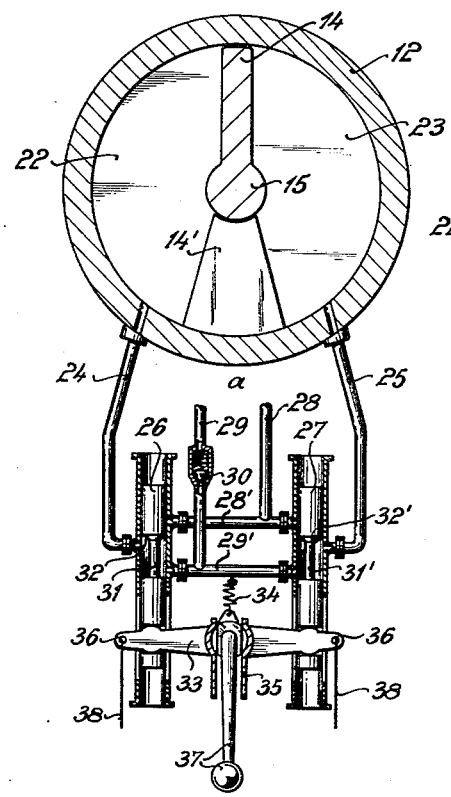

During normal operation of the tractor, i.e., if the mechanical steering is operative and effective, the adjusting member 33 of the control apparatus 13 is in the zero position thereof indicated in FIGURES 3 to 6, whereas the rotary piston 14 is in the neutral position essentially half-way between the working spaces 22 and 23. In this initial position, which is shown in FIGURE 3, the pressure supply line 28 is blocked by the pistons 26 and 27. The pressure oil supplied from any suitable pump or the like (not shown) thereby flows in any suitable manner over a check valve or excess pressure valve (not shown) back into the usual reservoir or sump (not shown).

When the tractor is steered manually by means of the steering wheel 5, then the oil which is stored in the working spaces 22 and 23 is displaced without counterforce in the one or the other direction depending on the desired steering movement of the tractor by reason of the connection of the rotary piston 14 with the steerable axle shaft 10 over lines 24 and 25 in the closed circuit thereof formed by lines 24, 29' and 25. A discharge of the oil into the reservoir over line 29 is prevented by the relief valve 30 which is suitably adjusted therefor.

Power Steering

Figure 4:
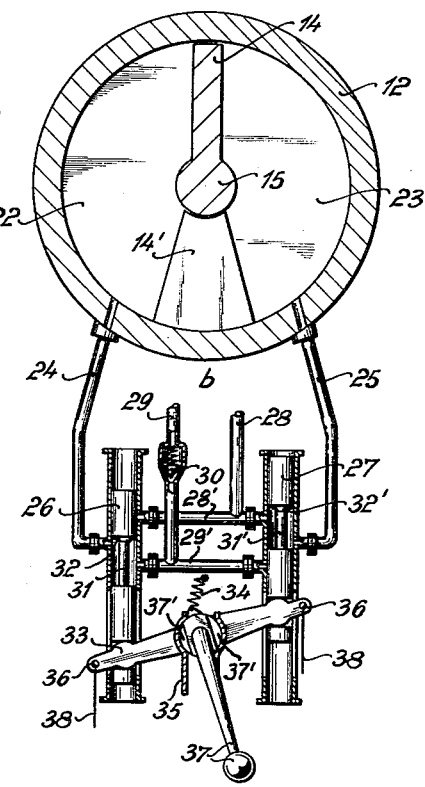

If an aid of the steering movement is necessary for purposes of heavy work, such as heavy plowing or foresting operations or the like, then the control lever 37 is pushed in the working position 0 thereof into the desired driving direction, whereby the control valve pistons 26 and 27 are displaced with respect to each other as shown in FIGURE 4. The piston 27 thereby opens the supply line 28 over connecting line 28' whereas the piston 26 releases the discharge line 29 over connecting line 29'. The oil under pressure flows thereby in the opened circulatory system $b$ (FIGURE 4) into the working space 23 and forces the wing-like member of the rotary piston 14 in the circumferential direction thereof in a counter-clockwise direction. Since the shaft 15 of the rotary piston member is operatively connected with the steerable axle shaft 10, the front wheels are also turned by the servo force into the desired direction. The quantity of pressure medium present in the working space 22 thereby flows off into the reservoir over lines 24, 29' and 29 by overcoming the relief valve 30. With an opposite movement of the control lever 37, the pressure conditions are exactly opposite, i.e., the oil present in the working space 23 flows off over lines 25, 29' and 29 into the reservoir, whereas the pressure supply takes places over lines 28, 28' and 24.

Remote Control With Power Steering

During agricultural operations, such as loading of hay or grain, distribution of fertilizer and the like, a one-man operation without repeated remounting of the tractor is desirable for the continued forward movement with simultaneous remote control. Such a control may be realized in accordance with the present invention at any suitable distance from the tractor by means of the cables 38. If, with the control lever 37 in the position 0, the operator rotates the manual control device 39 (FIGURE 1) of the cable or Bowden-wire system, then, depending on the direction of rotation, one or the other end of the adjusting member 33 (FIGURE 3) is displaced. As a result of such displacement by the cables 38, the control pistons 26 and 27 are brought into one or the other operative position thereof whereby, as described hereinabove in connection with the operation of the power steering mechanism, the rotary piston 14 is set into motion and thereby turns the steerable wheels.

Shock-Absorption in Steering System

If the control lever 37 and therewith the adjusting member 33 is pushed in the guide means 35 into the control position 1 thereof, as illustrated in FIGURE 5, then the control edges 32 and 32' of the control pistons 26 and 27 slide in the same direction, i.e., are moved in the same direction by the same amount so that they come to be substantially at the height of lines 24 and 25 and therewith partially cover or throttle the same. In this position, the control lever 37 cannot be actuated by rotation thereof since the flattened sides 37' thereof are now in engagement with the relatively narrower straight portion of the guide means 35; the supply of the pressure medium over lines 28 and 28' is thereby forcibly interrupted.

Whereas according to the operational condition illustrated in the embodiment of FIGURE 3, while driving over uneven terrain, all of the road shocks are able to get into the steering system and are thereby transmitted to the driver, the control pistons 26 and 27 act as throttling pieces in the closed circuit $c$ consisting of lines 24, 29' and 25 according to FIGURE 5 so that the circulation of the oil normally produced by road shocks which seek to rotate the wheels is subjected to a throttling action. As a result thereof, the steering movements are damped and the driver is kept relatively free of shocks and vibrations.

Locking of Steering System

During gathering or collecting of agricultural products, such as potatoes, or during cultivating operations, it is desirable that the tractor operates at a low speed and maintains a prescribed or predetermined direction of travel without necessitating steering thereof by the operator who is usually otherwise occupied. Such a control may be readily achieved in accordance with the present invention if the adjusting member 33 is pushed into the position 2 thereof (FIGURE 6).

In this operating position of FIGURE 6, the supply of pressure medium from lines 28 and 28' is interrupted and simultaneously therewith the return flow of the pressure medium, such as oil, out of the working spaces 22 and 23 is also blocked by the same piston valve members 26 and 27 which cut off lines 24 and 25. The steerable wheels of the driving tractor cannot, therefore, be deflected when passing over obstacles by reason of the hydraulic blockage or stoppage of the steerable axle shaft 10 due to the fact that the essentially incompressible oil in working spaces 22 and 23 is forced to remain therein. As a result thereof, the steering movements are damped and the driver is kept free of vibrations and shocks.

If so desired, the servo installation described hereinabove may be further developed and refined to provide additional control functions. For example, a furrow control mechanism is illustrated in FIGURES 7 and 8 which is operatively connected with the rotary piston member 14. The rotary piston member 14 for that purpose includes a hollow shaft 40 which is in communication with the pressure spaces 22 and 23 over apertures 41 and 42. A control piston 43 is placed into the shaft 40 which is provided with a pressure space 45 and a return groove 44. A control member 46 is operatively connected with the piston 43 to rotate in unison therewith which control member 46 carries the sensing installation 47 provided with a guide wheel 48 of any appropriate conventional construction. The pressure space 45 of the piston 43 is connected over line 49 with the line 25 leading to the control apparatus 13 whereas the return groove 44 of piston 43 is connected therewith over lines 50 and 24. Connecting line portions 24' and 25' lead from two-way valves 51' and 51 to working spaces 23 and 22, respectively, lines 49, 25, and 25', and lines 50, 24, and 24' also terminating at two-way valves 51 and 51', respectively, which are adapted to be actuated in unison by any suitable mechanical linkage to the positions shown in FIGURE 8 or to the alternate positions in which lines 24 and 25 are connected to lines 24' and 25', respectively.

OPERATION

During operation of the installation of the embodiment of FIGURES 7 and 8 with the control lever 37 and two-way valves 51 and 51' in the positions illustrated therein, the guide roller 48 of the furrow control sensing device 47 follows the furrow 53 established during the previous plowing of the field. If the tractor moves out of the track by the lateral pull of the plow shares, then a relative movement between the control piston 43 and the rotary piston member 14 takes place by means of the guide member 46. As a result thereof, depending on the direction of movement of the wheels, either the aperture 41 or the aperture 42 comes into communication with the pressure space 45. If it is assumed that the relative movement is such that pressurized oil is able to enter over aperture 41 into the working space 22, then the pressure oil controls the rotary piston member 14 and thereby automatically readjusts the vehicle wheels until the initial condition is re-established. The pressure cushion present in the working space 23 is thereby correspondingly reduced over bore 42 and the return groove 44. It is understood that the embodiment of FIGURES 7 and 8 is also able to perform all the control functions described in connection with FIGURES 3 through 6 as soon as two-way valves 51 and 51' are adjusted to connect lines 24 and 24' and lines 25 and 25' with each other.

However, the present invention is not limited to the illustrated embodiment. For example, instead of the hydraulic servo mechanism, a pneumatic control may be provided. Furthermore, the servo motor may also be directly connected with the control apparatus or may form a structural unit with the steering gear. Additionally, the installation is not limited to rotary pistons or control valve member. In the place of the furrow control arrangement connected with the rotary piston, it is also possible, for example, to actuate other aggregates or controllable units arranged in or at attachments which may be detachably attached in front or to the rear of the tractor, by means of flexible lines.

Thus, the present invention is not limited to the specific embodiments illustrated herein but is susceptible of many changes and modifications within the spirit and scope of the present invention, and I, therefore, wish to cover all such changes and modifications as encompassed by the appended claims.

I claim:

1. A control arrangement for a tractor having a servo mechanism aiding the steering movement of the steerable wheels, comprising manual steering means, servo motor means operatively connected with said steering means, and a control device including control means for controlling said servo motor means, guide means for said control means including means to hold said control means in different operating positions corresponding to a plurality of mutually different servo control functions, said control means including, for each said function, means regulating the operation of said servo motor in a different manner, one of said last-mentioned means providing a steering power-assist function and another of said last-mentioned means resisting change of direction of said steerable wheels when the latter are acted upon by ground or other external forces.

2. A control arrangement for a tractor according to claim 1, wherein said control means includes at least one open and several closed working circuits for a pressure medium for determining said functions respectively, and adjusting means including valving means operatively connected therewith for controlling the flow of pressure medium in said circuits.

3. A control arrangement for a tractor according to claim 1, wherein said control means includes common supply and discharge means for a pressure medium, positively controlled valve members controlling said common supply and discharge means for the pressure medium, and line means connecting said servo motor means with said common supply and discharge means over said valve members.

4. A control arrangement for a tractor according to claim 3, wherein said control means includes an adjusting member for positively actuating said valve members.

5. A control arrangement for a tractor according to claim 4, wherein said adjusting member includes means for selectively adjusting the same either at the tractor or remote therefrom.

6. A control arrangement for a tractor according to claim 4, wherein said adjusting member is constructed as a double-armed lever operatively connected with said valve members.

7. A control arrangement for a tractor according to claim 6, wherein said valve members include two axial pistons disposed parallel to each other, each of said pistons being provided with at least one conically extending control edge.

8. A control arrangement for a tractor, especially agricultural tractors, having a servo mechanism aiding the steering movement of the steerable wheels, comprising steering means including a steering gear with a steering serevo motor means operatively connected with said steerng means, and a control device including control means for controlling said servo motor means and operative to be adjusted into different operating positions corresponding to a plurality of mutually different servo control functions, said servo motor means being operatively connected in said steering means intermediate said steering gear and said steerable wheels and remote from said control device, said servo motor means including a rotary piston means and a plurality of pressure spaces, said rotary piston means having a hollow shaft in communication in the interior thereof with said pressure spaces, said control device including automatic tracking means comprising a control piston means within said hollow shaft and operatively connected to control pressure in said spaces from a pressure source to readjust said rotary piston means.

9. A control arrangement for a tractor according to claim 8, wherein each steerable wheel includes steerable axle means, and readily detachable coupling means for mounting said rotary piston means on one of said axle means.

10. A control arrangement for a tractor according to claim 8, wherein said automatic tracking means includes said rotary piston means for maintaining said tractor along a predetermined track and is provided with sensing means including guide means carrying a roller member adapted to follow a previously established furrow, said control piston means being operatively connected with said sensing means and cooperating with said rotary piston means to automatically readjust the same.

11. A control arrangement for a tractor, especially agricultural tractors, having a servo mechanism including servo motor means assisting the steering movement of the steerable wheels, comprising a manual steering means system, said servo mechanism further comprising a control device comprising movable control means for said servo motor means, said movable control means being free of connection to said manual steering means system and movable independently thereof, said control means including a member for engaging and holding said movable means in different operating positions, said control device comprising a plurality of means, when said movable means are in said different positions, to regulate the operation of said servo motor means, in respectively different manners corresponding to said different operating positions to enable said servo motor means to perform diverse functions, said functions comprising a steering assist function and at least one other active steerable-wheels-controlling function, said plurality of means to regulate the operation of said servo motor means comprising means individual to and facilitating the performance of each of said functions.

12. A control arrangement for a tractor, according to claim 11, wherein said steering assist function is a remote steering function, and further including remote control means connected to said member for controlling said steering assist function.

13. A control arrangement for a tractor according to claim 11, wherein said control means for adjusting said servo motor for said plurality of means to regulate the operation of said servo motor means further includes individual means to enable said servo motor means to perform a function operative to dampen the steering movements and a further function to lock the steering movements.

14. Steering mechanism for a tractor, comprising manual steering means including steerable axle means, a steering gear operatively connected to said axle means, and a manually operated steering wheel, servo steering means connected to said axle means, control means for controlling the operation of said servo steering means, said control means including a plurality of slide valves, a plurality of pressure circuits in selective operative communication with said servo steering means, said slide valves being operatively connected with said pressure circuits, an adjusting member movable independently of said manual steering means for moving said slide valves to selective positions, said slide valves when in said positions being effective to establish said selective operative communication, said positions corresponding to a plurality of mutually different servo control functions, and means for selectively holding said adjusting member in any one of a plurality of positions corresponding to said different servo control functions.

References Cited in the file of this patent

UNITED STATES PATENTS

| | | |
|---|---|---|
| 1,857,380 | Hubbell | May 10, 1932 |
| 1,859,333 | Josephs | May 24, 1932 |
| 1,980,553 | Salisbury | Nov. 13, 1934 |
| 2,134,426 | Wood | Oct. 25, 1938 |
| 2,674,333 | Zeilman | Apr. 6, 1954 |
| 2,685,342 | Lauck | Aug. 3, 1954 |
| 2,728,463 | Beckwith | Dec. 27, 1955 |

FOREIGN PATENTS

| | | |
|---|---|---|
| 747,214 | Great Britain | May 28, 1956 |

(U.S. corresponding—2,857,976—Oct. 28, 1958)